United States Patent
Ben Rached et al.

(10) Patent No.: US 7,197,023 B2
(45) Date of Patent: Mar. 27, 2007

(54) METHOD AND APPARATUS FOR CONTROLLING THE SENDING OF DATA BLOCKS

(75) Inventors: Nidham Ben Rached, Paris (FR); Jean-Louis Dornstetter, Choisel (FR)

(73) Assignee: Nortel Networks Limited, St. Laurent (CA)

( * ) Notice: Subject to any disclaimer, the term of this patent is extended or adjusted under 35 U.S.C. 154(b) by 1040 days.

(21) Appl. No.: 10/158,309

(22) Filed: May 30, 2002

(65) Prior Publication Data
US 2003/0026204 A1    Feb. 6, 2003

(30) Foreign Application Priority Data
Jun. 5, 2001    (FR) .................................. 01 07306

(51) Int. Cl.
*H04B 7/212*    (2006.01)
(52) U.S. Cl. ...................... 370/337; 370/347; 370/468; 455/452.2
(58) Field of Classification Search ................ 370/329, 370/341, 348, 232, 235, 237, 337, 347, 468; 455/450, 452.1, 452.2
See application file for complete search history.

(56) References Cited

U.S. PATENT DOCUMENTS

| | | | |
|---|---|---|---|
| 5,497,368 A * | 3/1996 | Reijnierse et al. .......... 370/351 |
| 6,393,012 B1 * | 5/2002 | Pankaj ....................... 370/342 |
| 6,760,344 B2 * | 7/2004 | Mizell et al. ................ 370/475 |
| 6,775,231 B1 * | 8/2004 | Baker et al. .............. 370/230.1 |
| 2001/0023453 A1 * | 9/2001 | Sundqvist .................... 709/232 |

FOREIGN PATENT DOCUMENTS

WO    WO 99/16264    4/1999

OTHER PUBLICATIONS

Ming-Ung Lin et al., "Supporting broadband, mobile, high-speed multimedia services base on TDMA MAC protocol", Systems, Man, and Cybernetics, 1999. IEEE SMC '99 Conference Proceedings. 1999 International Conference on Tokyo, Japan, Oct. 12-15, 1999, pp. 992-997.

(Continued)

*Primary Examiner*—Chau Nguyen
*Assistant Examiner*—Kerri M. Rose
(74) *Attorney, Agent, or Firm*—Trop, Pruner & Hu, P.C.

(57) ABSTRACT

The blocks to be sent on one or more physical channels for packet mode transmission pertain to several temporary block flows to terminals. The terminals are distributed into several subscription classes corresponding to various priority levels and each associated with a throughput restriction parameter. Transmission throug hputs allocated to the flows as a function of transmission throughputs respectively requested during the creation of the flows and restriction parameters associated with the subscription classes are determined. At least one traffic channel supported by a physical channel is allotted to each new flow created. For each send period on a physical channel, a flow to which a traffic channel supported by this physical channel is allotted, is selected with the aid of the values of the transmission throughputs allocated, so as to send a block of the selected flow in the course of said period.

16 Claims, 4 Drawing Sheets

OTHER PUBLICATIONS

Taaghol P et al., "An air interface solution for multi-rate general packet radio service for GSM/DCS", Vehicular Technology Conference, 1997, IEEE 47th Phoenix, AZ, USA, May 4-7, 1997, pp. 1263-1267.

AJIB W et al., "Acknowledgement operations in the RLC layer of GPRS", Mobile Multimedia Communications, 1999, 1999 IEEE International Workshop on San Diego, CA, USA, Nov. 15, 1999, pp. 311-317.

ETSI TS 101 350, "Digital cellular telecommunications system (Phase 2+) ; General Packet Radio Service (GPRS) ; Overall description of the GPRS radio interface ; Stage 2 (GSM 03.64, version 8.5.0, Release 1999)", ETSI publication (European Telecommunications Standards Institute) of Aug. 2000.

ETSI EN 301 349, "Digital cellular telecommunications system (Phase 2+) ; General Packet Radio Service (GPRS) ; Mobile Station (MS)—Base Station System (BSS) interface ; Radio Link Control/Medium Access Control (RLC/MAC) protocol (GSM 04.60, version 8.3.1, Release 1999)", ETSI publication (European Telecommunications Standards Institute) of Oct. 2000, pp. 70-105.

* cited by examiner

METHOD AND APPARATUS FOR CONTROLLING THE SENDING OF DATA BLOCKS

BACKGROUND OF THE INVENTION

The present invention relates to techniques for allocating resources for packet mode data transmission.

It is applied to packet transmission systems wherein transmission resources are shared by multiplexed data flows intended for several users. Each block transmitted on such a resource contains an identity of the flow from which the data which it comprises emanate. The user terminals which share the resource receive at least the part of each block which contains the flow identity, thereby enabling them to determine whether they are concerned by the data of the block.

The invention applies in particular to radio communication systems of GPRS ("General Packet Radio Service") type. These systems have been developed to allow the packet mode transmission of data in cellular networks of GSM ("Global System for Mobile communications") type.

GSM networks use a of Time Division Multiple Access (TDMA) scheme in which the physical channels defined in each cell correspond to recurrent time slots on a carrier frequency. These time slots repeat at a frame rate, each frame being composed of eight slots. This multiplexing scheme, intended originally for circuit-mode transmissions, has been adopted to support a packet service, namely GPRS. On the uplink path (from the mobile stations to the network), access to the GPRS physical data channel is controlled by commands supplied by the network. On the downlink path (from the network to the mobile stations), the network selects a user flow for each occurrence of the time slot on the physical channel.

A GPRS data channel is allocated temporarily, when data are to be transmitted. Temporary block flows (TBFs) are thus constantly created and deleted.

In this context, the management of the throughputs supplied to the various flows is a complex problem. It is theoretically possible to search at each instant for the optimum allocation of resources as a function of the throughputs requested for the various active flows and of the number (fixed or variable) of physical channels dedicated to the GPRS service in the cell. However, in practice, this optimization requires a prohibitive quantity of calculations, given the very frequent creation and deletions of TBFs. Moreover, account must be taken of the fact that certain flows have priority over others, as a function of the subscriptions taken out, and the fact that certain terminals may have different reception capacities in terms of number of slots per frame.

An object of the present invention is to propose a throughput management mode which takes these constraints into account and which is relatively simple to implement.

SUMMARY OF THE INVENTION

The invention thus proposes a method of controlling the sending of data blocks pertaining to a plurality of temporary block flows to terminals on a number L of physical channels dedicated to packet mode transmission of data, L being a number at least equal to 1, wherein each physical channel has successive periods each intended for sending one block. The method comprises the steps of:

determining transmission throughputs respectively allocated to the block flows as a function of transmission throughputs respectively requested when creating the flows;

allotting to each new flow created at least one logical traffic channel supported by one of the L physical channels; and selecting, for each send period on a physical channel, a block flow to which a logical traffic channel supported by said physical channel is allotted so as to control sending of a block of the selected flow in said send period, the flow selection being governed by the values of the transmission throughputs allocated to the flows to which logical traffic channels supported by said physical channel are allotted, The terminals are distributed into a plurality of subscription classes corresponding to different priority levels, and with each subscription class is associated a throughput restriction parameter representing a proportion of the overall throughput requested for the block flows to terminals of said class. The transmission throughputs allocated to the flows are so determined as to take account of the proportions represented by the restriction parameters in case of insufficiency of the physical channels dedicated to the packet mode relative to the total throughput requested for the block flows.

The method controls the time multiplexing of the flows by allocating them throughputs which, in case of shortage of the transmission resources, are determined by restriction parameters included in the subscription parameters. The different priorities which may exist between the flows are then easily taken into account. The overall allocation of resources is not in accordance with the optimum solution of the allocation problem, but it allows efficient multiplexing and relatively easy implementation, compatible with the very frequent requests for TBF creation and deletion.

Typically, the throughput restriction parameter associated with a given subscription class represents a proportion of the overall throughput requested for the set of block flows to terminals of this class which may not be allocated to said set of flows in at least some of the cases of insufficiency of the physical channels dedicated to the packet mode.

In a particular embodiment, the method responds to the creation of a block flow, for which a throughput is requested such that the physical channels dedicated to the packet mode become insufficient relative to the total throughput requested, by allocating to the block flows to the terminals of the subscription class corresponding to the lowest priority level transmission throughputs smaller than the throughputs respectively requested for said flows, whereby the ratio of the overall throughput allocated to said flows to the overall throughput requested for said flows is at most equal to 1 minus the throughput proportion represented by the restriction parameter associated with said class.

More generally, as the subscription classes are indexed by an integer k ranging from 1 for the class of lowest priority to N for the class of highest priority, the method may comprise the following steps in response to the creation of a block flow for which a throughput is requested such that the difference between the total throughput requested and the throughput capacity of the physical channels dedicated to the packet mode becomes greater than $$\sum_{k=1}^{n} M_k \cdot Dt_k$$

(n being an integer such that $1 \leq n < N$, $M_k$ designating the throughput proportion represented by the throughput restriction parameter associated with class k and $Dt_k$ designating the overall throughput requested for the flows to the terminals of class k):

allocating to the block flows to the terminals of each class k, with $1 \leq k \leq n$, transmission throughputs substantially equal to $1-M_k$ times the throughputs respectively requested for said flows; and allocating to the block flows to the terminals of class n+1, transmission throughputs which are less than the throughputs respectively requested for said flows, the ratio of the overall throughput allocated to said flows to the overall throughput requested for said flows being at most equal to $1-Mn_{+1}$.

Should there be a very demanding request for throughput (creation of a block flow for which a throughput is requested such that the difference between the total throughput requested and the throughput capacity of the physical channels dedicated to the packet mode becomes equal to $$\alpha \times \sum_{k=1}^{N} M_k \cdot Dt_k$$

with $\alpha > 1$), this throughput allocation mode can be supplemented with a uniform reduction of all the classes. Transmission throughputs substantially equal to $(1-M_k)/\alpha$ times the throughputs respectively requested for said flows are then allocated to the block flows to the terminals of each class k.

Symmetrically, in response to the deletion of a temporary block flow arising while the physical channels dedicated to the packet mode were insufficient relative to the total throughput requested for the block flows, the throughputs allocated to the block flows to the terminals of the subscription class corresponding to the highest priority level which were previously allocated throughputs smaller than the throughputs requested are increased.

Another aspect of the present invention relates to an apparatus for controlling the sending of data blocks pertaining to a plurality of temporary block flows to terminals, comprising processing means arranged for implementing a method as defined hereinabove.

DESCRIPTION OF PREFERRED EMBODIMENTS

The invention is described hereinbelow in its application to the infrastructure of a GPRS network.

Figure 1:
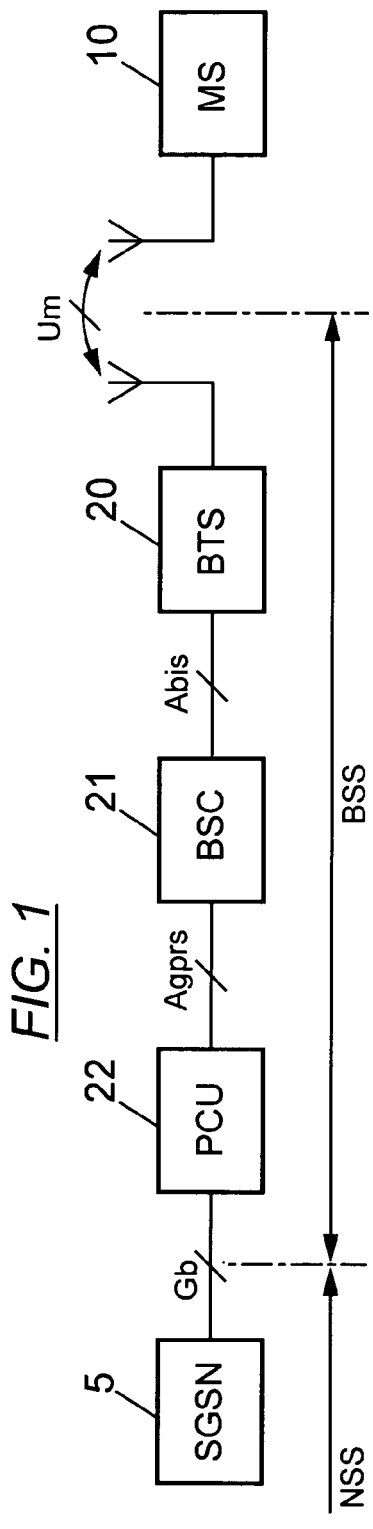
FIG. 1 is a diagram of a GPRS type network to which the invention can be applied.

The GPRS network illustrated in FIG. 1 is built on a GSM infrastructure, and conventionally divided into a core network, also called Network and Switching Subsystem or NSS, and a radio access network also called base station subsystem or BSS.

For the packet service, the switches of the NSS are called GPRS support nodes or GSNs. A distinction is made between the SGSNs (Serving GSNs) 5 which are linked to the BSS by way of an interface called Gb, and the GGSNs (Gateway GSNs, not represented) which serve as a gateway with external packet transmission networks, such as the Internet, for example.

A general description of the radio interface, called Um, between the mobile stations (MS) 10 and the base transceiver stations (BTS) 20 of the BSS is provided in the technical specification ETSI TS 101 350, "Digital cellular telecommunications system (Phase 2+); General Packet Radio Service (GPRS); Overall description of the GPRS radio interface; Stage 2 (GSM 03.64, version 8.5.0, Release 1999)", published by ETSI ("European Telecommunications Standards Institute") in August 2000.

Each base station 20 is supervised by a base station controller or BSC 21 through an interface called Abis. In order to manage the transmission of GPRS packets, the BSS further comprises an entity 22 called packet control unit or PCU. The locating of the PCU within the BSS is not standardized. In the example represented in FIG. 1, the PCU 22 is situated between the BSC 21, with which it communicates via an interface called Agprs, and the NSS, with which it communicates via the Gb interface.

Figure 2:
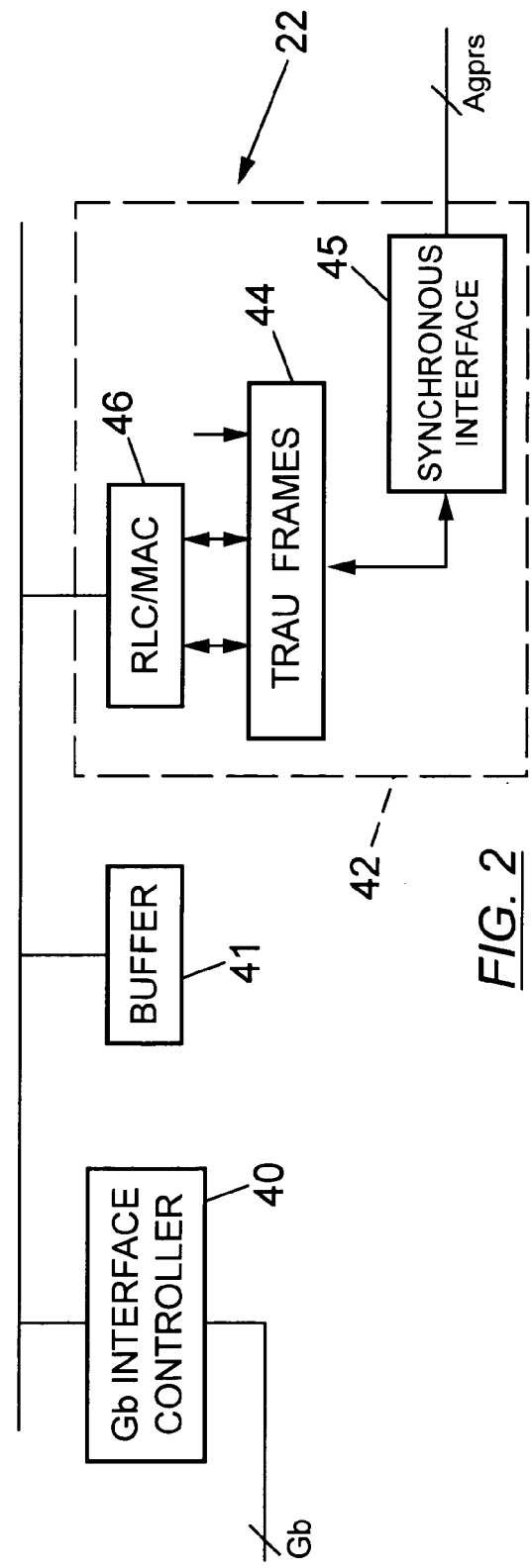
FIG. 2 is a schematic diagram of a packet control unit of such a network, suitable for implementing of the invention.

FIG. 2 illustrates a possible structure of a PCU 22 situated between an SGSN 5 and a BSC 21, as in the example of FIG. 1. The reference 40 designates the Gb interface controller for the link with the SGSN 5.

The Gb interface is of asynchronous type. It is based on the frame relay (FR) protocol, as well as on a protocol called BSSGP ("BSS GPRS Protocol") which transports routing and quality-of-service information between the BSS and the SGSN. The Gb interface controller 40 provides the physical link with the SGSN 5, as well as carrying out the procedures specific to the FR and BSSGP protocols.

The links between the PCU 22 and the BTSs 20 via the Agprs interface are of synchronous type. Consequently, the data manipulated by the PCU 22 between the Gb interface controller 40 and the Agprs interface controller 42 transit via a buffer memory 41 where packet queues are recorded.

Between the PCU 22 and the BTS 20, the information is carried by 320-bit frames of TRAU ("Transcoder/Rate Adapter Unit") type, at the rate of one frame every 20 ms. These TRAU frames are formatted and processed by a module 44 and transmitted by way of synchronous interface circuits 45 which form PCM sub-channels at 16 kbit/s with the BTSs 20. Several 16-kbit/s sub-channels can be multiplexed on the Agprs interface and separated by the BSC 21 for routing to the BTSs. A module 46 of the Agprs interface controller 42 implements the radio protocols of layer 2 of the OSI model, i.e. the RLC/MAC ("Radio Link Control/Medium Access Control") protocols described in the European Standard ETSI EN 301 349, "Digital cellular telecommunications system (Phase 2+); General Packet Radio Service (GPRS); Mobile Station (MS)—Base Station System (BSS) interface; Radio Link Control/Medium Access Control (RLC/MAC) protocol (GSM 04.60, version 8.3.1, Release 1999)", published by ETSI in October 2000.

The RLC sub-layer forms the interface with the upper-layer protocol, called LLC ("Logical Link Control"). It carries out the segmentation and the reassembling of LLC protocol data units (LLC-PDUs), which are exchanged asynchronously on the Gb interface. It produces RLC data blocks to which the MAC sub-layer adds a one-byte MAC header.

The multiplexing of the packets in the form of RLC/MAC blocks uses a Temporary Flow Identity (TFI) placed in the RLC header of each block. The TFI is composed of five bits identifying the Temporary Block Flow (TBF) from which the RLC data of the block originate. A TBF is a connection supporting the unidirectional transfer of LLC-PDUs on physical data channels. A TBF is temporary, i.e. it is maintained only during the transfer of data.

The MAC sub-layer manages the multiplexing of the blocks arising from the various TBFs which are active on the available physical channels, arbitrating among the various mobile users via a scheduling mechanism, consisting in selecting a TBF for each send period on the channel.

Figure 3:
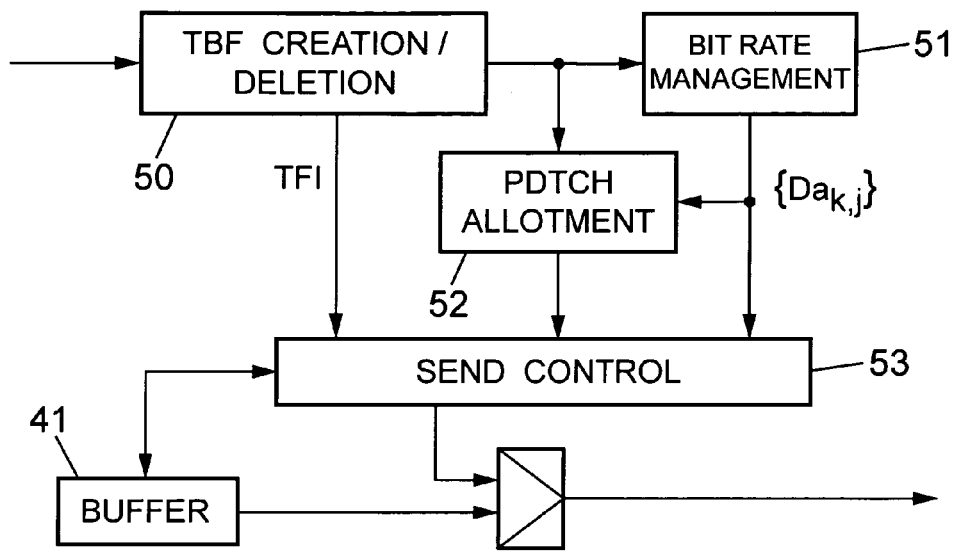
FIG. 3 is a schematic diagram of the sending part of a packet control unit according to FIG. 2.

FIG. 3 shows a possible organization of the elements of the RLC/MAC module 46 which are involved in the multiplexing of the downlink blocks. The TBFs are created and deleted by a unit 50 as a function of signaling information received from the LLC layer and/or the content of the send buffer memory 41.

In response to the creation of a TBF for which a throughput D is requested or to the deletion of a TBF, a unit 51 for managing throughputs calculates a set of throughputs $Da_{k,j}$ allocated to the various active users (TBF). As long as the sum of the requested throughputs does not exceed the downlink transmission capacity DMAX in the relevant cell, these allocated throughputs $Da_{k,j}$ are equal to the throughputs respectively requested for the various TBFs. In case of overflow, at least some of the users will not be allocated the requested throughput but a smaller throughput, determined for example in the manner described later with reference to FIGS. 4a, 4b and 5.

The GPRS system uses the TDMA frame structure of GSM. An elementary physical transmission channel in a cell consists of a time slot on a carrier frequency. When this channel is dedicated to packet traffic, it is called PDCH ("Packet Data Channel"). On each carrier, the time is distributed as successive frames of 4.615 ms, each frame being composed of eight time slots of 0.577 ms. The PDCH is then defined by a carrier index and a slot index within the frame structure. An RLC/MAC block is distributed over four consecutive time slots of the PDCH on which it is sent. The PDCH can therefore be regarded as being distributed as successive send periods each corresponding to four consecutive frames. An RLC/MAC block is sent during such a send period.

The aforesaid throughputs (after channel coding) can be expressed as a number of time slots per period of 4.615 ms, in which case the downlink transmission capacity DMAX is equal to the number $L \geq 1$ of downlink physical channels dedicated to the GPRS service in the cell. For example, if a single carrier frequency is used (completely) for the GPRS service in a given cell, then DMAX=L=8 for this cell. We may have DMAX<8 since a carrier may be used only partially for the GPRS service. We may also have DMAX>8 since PDCHs can exist on more than one carrier in a given cell. The PCU can vary the number L over time as a function of the requirements.

A logical traffic channel allotted to a data transfer is called PDTCH ("Packet Data Traffic Channel"). A PDTCH is temporarily dedicated to a terminal when a TBF is activated for the latter. The PDTCHs sharing one and the same PDCH are distinguished by means of the flow identities TFI placed in the RLC/MAC headers of the blocks sent. A terminal can use multiple PDTCHs in parallel for a given transfer of packets.

Each GPRS terminal, regarded as the association of user equipment and a subscription, possesses certain characteristics which are involved in the packet multiplexing scheme on the downlink channel:

a maximum allowable throughput, dependent on the subscription. At the level of the RLC/MAC layer, the throughput D requested for a TBF to the terminal will always be less than or equal to this maximum throughput;

a multislot capability on the downlink path. A terminal with multislot capability C can simultaneously receive packets on C PDCHs of one and the same carrier for a given flow, i.e. it can place itself in listen mode during C consecutive slots of a frame on a carrier (C integer with $1 \leq C \leq 8$);

a subscription class making it possible to define priorities between various flows. In the following, this class is represented by an integer index k lying between 1 and N, the index N(>1) representing the class of highest priority. By way of example, k=N=4 for a "platinum" subscription, k=3 for a "gold" subscription, k=2 for a "silver" subscription and k=1 for a "best effort" subscription.

Let P(k) denote the number of active TBFs in a given cell relating to terminals of class k ($P(k) \geq 0$). The throughput requested for the set of these P(k) TBFs is denoted $Dt_k$, and the throughput allocated by the unit 51 to the set of these P(k) TBFs is denoted $Dta_k$. For $1 \leq j \leq P(k)$, the notations $D_{k,j}$ and $Da_{k,j}$ respectively designate the throughput requested for the j-th TBF of class k and the throughput allocated to this j-th TBF, with $$Dt_k = \sum_{j=1}^{P(k)} D_{k,j}$$

and $$Dta_k = \sum_{j=1}^{P(k)} Da_{k,j}.$$

The total throughputs, requested and allocated, are respectively $$DT = \sum_{k=1}^{N} Dt_k \text{ and } DTA = \sum_{k=1}^{N} Dta_k.$$

On startup, the quantities $Dt_k$, $Dta_k$ ($1 \leq k \leq N$), DT and DTA are initialized to zero.

When the unit 51 has to reduce the throughput allocated to certain of the users, the selection of the users in question is effected by considering the subscription classes. To do this, each class is associated with a throughput restriction parameter $M_k$ lying between 0 and 1, corresponding to a maximum degree of reduction of the throughput allocated to the TBFs of class k. When the transmission capacities of packets in the cell are at saturation (DT>DMAX), the unit 51 begins by removing throughput from the users of the lowest priority class, up to the proportion $M_1$. Next, it does the same with the other classes, in order of priority. In general we will take $M_1 > M_2 > \ldots > M_N = 0$, thus ensuring the best treatment for users of the higher classes.

Figure 4B:
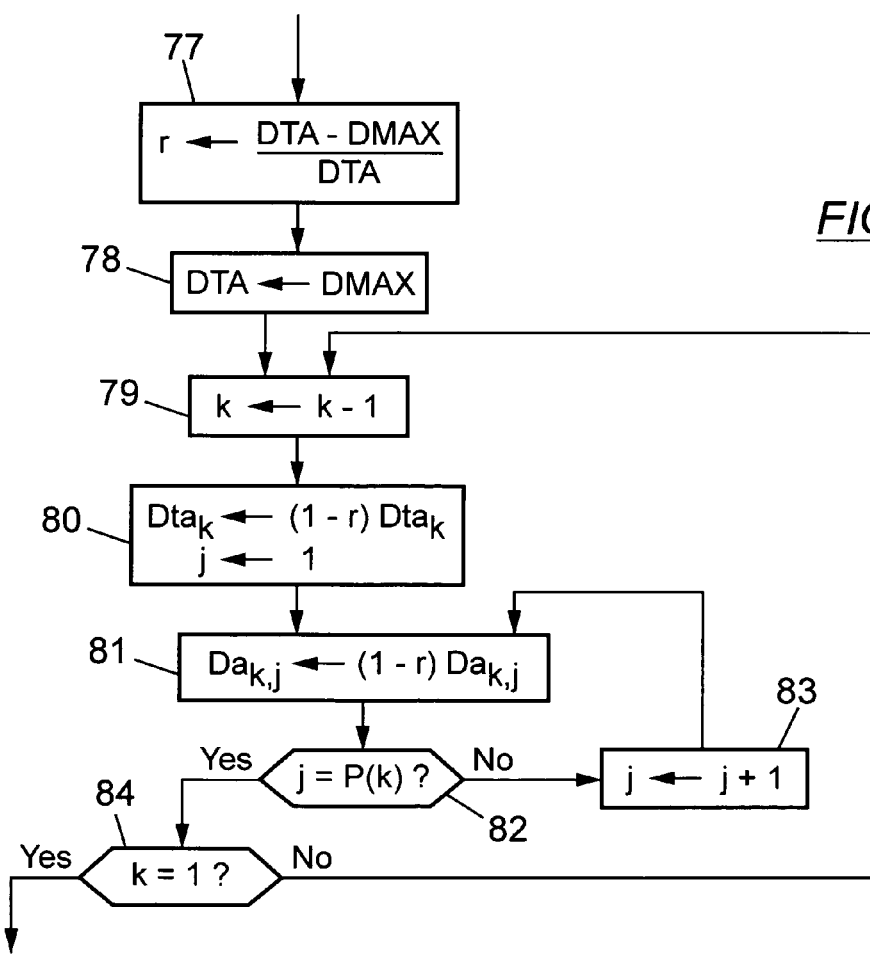
FIGS. 4a and 4b show a flowchart of a procedure that can be applied by a throughput management module of a unit according to FIG. 3 when creating a temporary block flow.
Figure 4A:
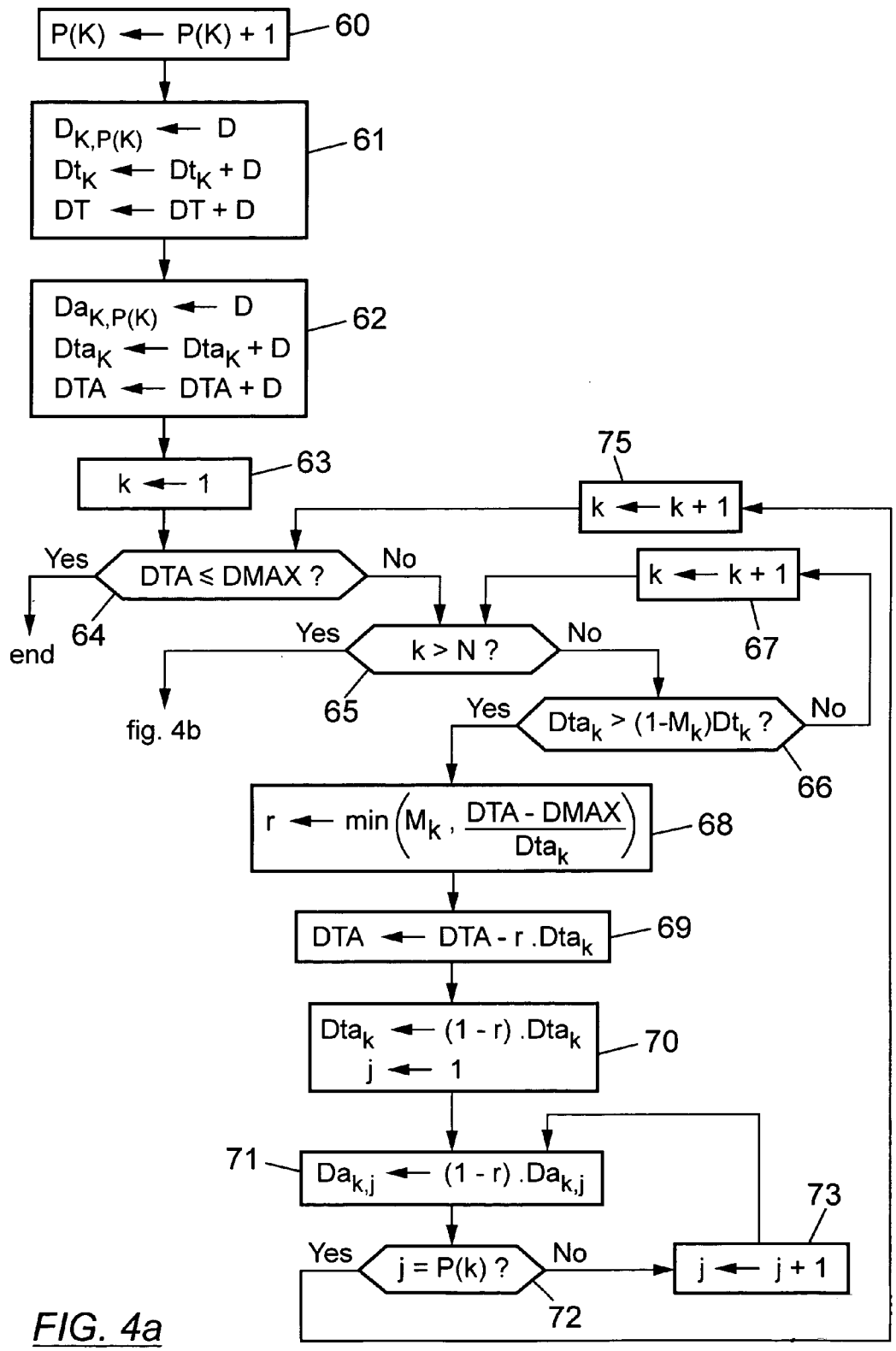
Figure 5:
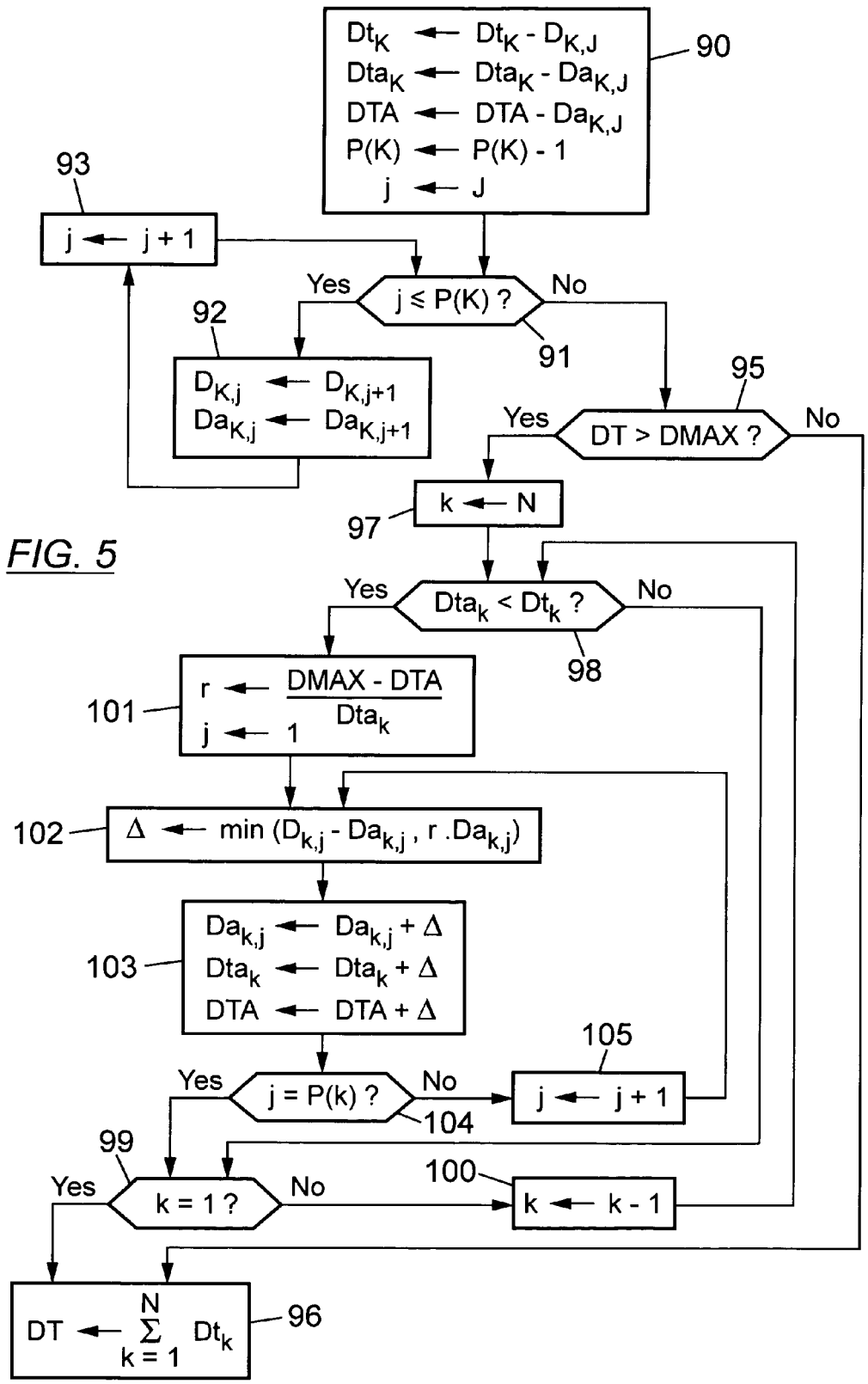
FIG. 5 shows a flowchart of a procedure that can be applied by the throughput management module when deleting a temporary block flow.

FIGS. 4a, 4b and 5 show procedures that can be applied by the unit 51 to adjust the allocated throughputs $Da_{k,j}$ when creating (FIGS. 4a and 4b) and when deleting (FIG. 5) a TBF to a terminal of class K ($1 \leq K \leq N$).

On the creation of a TBF of class K for which a throughput D is requested (FIG. 4a), the number P(K) is firstly incremented by one unit in step 60. The throughput $D_{K,P(K)}$ receives the value D of the requested throughput, and the total throughputs $Dt_K$ and DT are increased by this value D in step 61. Initially (step 62), the new allocated throughput $Da_{K,P(K)}$ is also taken equal to D, and the total throughputs $Dta_K$ and DTA are also increased by D. The index of class k is initialized to 1 (class of lowest priority) in step 63 so as to initialize a loop for reducing the throughputs allocated in the case where the next test 64 shows that the allocated total throughput DTA exceeds the maximum value DMAX. The procedure terminates when such exceeding does not occur.

When DTA>DMAX in test 64, the index k is compared with N in test 65. If $k \leq N$, another test 66 is performed to determine whether class k has already undergone the maximum reduction in throughput as defined by the parameter $M_k$. If such is the case ($Dta_k \leq (1-M_k) \cdot Dt_k$ in test 66), the index of class k is simply incremented by one unit in step 67 before returning to test 65. If throughput can be sacrificed in class k ($Dta_k > (1-M_k) \cdot Dt_k$ in test 66), the next step 68 consists in calculating a degree of reduction of throughput applicable to the TBFs of class k. This degree r is equal to the quantity $(DTA-DMAX)/Dta_k$ with a cutoff ceiling at $M_k$. The value DTA of the allocated total throughput is decreased by $r \cdot Dta_k$ in step 69, then the value $Dta_k$ of the throughput allocated to the TBFs of class k is decreased by the same quantity in step 70. The throughput $Da_{k,j}$ allocated to each TBF of the class is reduced in the same proportion r in each iteration 71 of a loop initialized by j=1 (when j<P(k) in the next test 72, the index j is incremented by one unit in step 73 before proceeding to the next iteration 71). At the end of this loop (j=P(k) in test 72), the class index k is incremented by one unit in step 75 before repeating test 64.

The scheme illustrated by FIG. 4a ensures, for $1 \leq k \leq N$, the condition:

$$(1-M_k) \times Dt_k \leq Dta_k \leq Dt_k \quad (1)$$

When $$\sum_{k=1}^{n} M_k \cdot Dt_k < DT - DMAX \leq \sum_{k=1}^{n+1} M_k \cdot Dt_k$$

with $0 \leq n < N$, we have $Dta_k \approx (1-M_k) \times Dt_k$ for $1 \leq k \leq n$, $(1-M_n) \times Dt_n \leq Dta_n \leq Dt_n$ and $Dta_k = Dt_k$ for $n < k \leq N$.

However, in certain cases of great insufficiency of the resources supplied by the L PDCHs, i.e. if $$DT - DMAX > \sum_{k=1}^{N} M_k \cdot Dt_k,$$

the conditions (1) can no longer be satisfied. Thus, when k>N in test 65, all the classes have already undergone throughput reductions in proportions at least equal to the parameters $M_k$. An additional uniform reduction is then applied to all the TBFs. The corresponding operations are illustrated by FIG. 4b.

The additional degree of reduction $r = (DTA-DMAX)/DTA$ is calculated (with no cutoff ceiling) in step 77. This degree satisfies the relation $(1-r) \approx 1/\alpha$ where $\alpha$ (>1) is defined by the relation $$DT - DMAX = \alpha \times \sum_{k=1}^{N} M_k \cdot Dt_k.$$

The value DMAX is then allotted to the parameter DTA in step 78 before performing a loop on the classes k. In each iteration of this loop, the index k is decremented by one unit in step 79, then the number $Dta_k$ is reduced in the proportion r in step 80. The throughput $Da_{k,j}$ allocated to each TBF of the class is reduced in the same proportion r in each iteration 81 of an internal loop initialized by j=1 (when j<P(k) in the next test 82, the index j is incremented by one unit in step 83 before proceeding to the next iteration 81), which comes back to taking $Da_{k,j} \approx [(1-M_k)/\alpha] \times D_{k,j}$. At the end of this loop (j=P(k) in test 82), the class index k is compared with 1 in test 84. If k>1, we return to step 79. The procedure is terminated when k=1.

In the deletion of the J-th TBF of class K ($1 \leq J \leq P(K)$), the number P(K) is decremented by one unit in step 90 (FIG. 5), where the throughput $D_{K,J}$ which had been requested for this TBF is subtracted from $Dt_K$, and the throughput $Da_{K,J}$ which had been allocated to it is subtracted from $Dta_K$ and from DTA. The throughput values $D_{K,j}$ and $Da_{K,j}$ for the TBFs of class K and of ranks j>J are then shifted to take account of the deletion of TBF J, in a loop 91–93 initialized with j=J. As long as $j \leq P(K)$ (test 91), a shift is performed in step 92 by replacing the throughput values $D_{K,j}$ and $Da_{K,j}$ with $D_{K,j+1}$ and $Da_{K,j+1}$, respectively, then the index j is incremented by one unit in step 93. After this shift (j>P(K) in test 91), the unit 51 determines in test 95 whether the PDCH resources of the cell were saturated before the deletion requested. If they were not saturated, i.e. if the requested total throughput DT was less than or equal to DMAX, the process terminates with the updating of $$DT = \sum_{k=1}^{N} Dt_k$$

in step 96.

If the PDCH resources of the cell were saturated (DT>DMAX in test 95), the unit 51 restores at least part of the throughput requested which was not allocated. It begins this restoration with the classes of highest priority, so that the class index k is initialized to N in step 97. If the throughput requested for the set of TBFs of class k was fully allocated ($Dta_k=Dt_k$ in test 98), the index k is compared with 1 in test 99. If k>1, this index k is decremented by one unit in step 100 before performing test 98 for the next class. If a part of the throughput requested for the TBFs of class k was not allocated ($Dta_k<Dt_k$ in test 98), a degree of increase r is calculated in step 101 according to r=(DMAX-DTA)/$Dta_k$, and the index j is initialized to 1 for the next loop 102–105. The throughput increment Δ is calculated in step 102 in each iteration of this loop, as being the minimum between the throughput insufficiency $D_{k,j}$–$Da_{k,j}$ and the fraction r.$Da_{k,j}$. The throughputs $Da_{k,j}$, $Dta_k$ and DTA are increased by this quantity Δ in step 103, after which the index j is compared with P(k) in test 104. If j<P(k), the index j is incremented by one unit in step 105 before returning to step 102 for the next iteration. When j=P(k), the unit goes to test 99. When k=1 in the test, the scheme terminates at the aforesaid step 96.

In response to the creation of a TBF (K, J) to which a throughput $Da_{K,J}$ has been allocated, a unit 52 allots one or more PDTCHs to the new TBF. This task is executed by minimizing a cost function q(f,t) defined for various PDCHs each identified by a carrier index f and a slot index t. An example of a usable cost function is given by:

$$q(f,t) = \sum_{u=t}^{t+C_{K,J}-1} \sum_{(k,j)\in T(f,u)} \frac{Da_{k,j}}{C_{k,j}}$$

where $C_{k,j}$ designates the multislot capability of the terminal for which TBF (k,j) is intended, and T(f,u) represents the set of TBFs to which a PDTCH is allotted on PDCH (f,u) at the relevant instant. This cost function q(f,t) is defined only for pairs (f, t) such that the slots t to $t+C_{K,J}-1$ ($\leq 8$) on the carrier f are PDCHs.

It should be noted that other cost functions could be used by the unit 52. Such functions may in particular weight the throughputs allocated to the other TBFs differently depending on the corresponding subscription classes.

After having identified the pair (f, t) which minimizes q(f,t), the unit 52 allocates $C_{K,J}$ PDTCHs to the new TBF (K, J) on the carrier f, in slots t to $t+C_{K,J}-1$.

The corresponding $C_{K,J}$ PDCHs are identified in the "Packet Downlink Assignment" signaling message transmitted to the recipient mobile station.

The RLC/MAC module of the PCU further comprises a controller 53 which caters for the sending of the downlink packets. Whenever it is necessary to produce an RLC/MAC block to be sent on a PDCH (f, t), the controller 53 takes responsibility for reading data in the buffer memory 41 and for appending the appropriate RLC/MAC header thereto, including in particular the identity TFI of the TBF to which these data pertain. If a single PDTCH exists on the PDCH in question, the data read pertain naturally to the TBF to which this PDTCH has been allotted. If there are several PDTCHs, the send controller 53 must select the TBF whose data are to be read.

This selection can be effected with the aid of variables $F_{k,j}$ kept up-to-date for each active TBF (as before, the index k represents the subscription class and the index j the rank of the TBF in the class). The variable $F_{k,j}$ is initialized to zero upon creation of the TBF. Whenever TBF (k,j) is selected for the sending of an RLC/MAC block (on any PDCH), the variable $F_{k,j}$ is increased by the quantity 1/$Da_{k,j}$. For a PDCH of index (f, t), the selection consists in taking the TBF (k, j) for which the variable $F_{k,j}$ is the smallest over the set T(f,t) at the start of the relevant send period.

When the allocated total throughput DTA does not exceed the capacity DMAX, this flow selection mechanism ensures that the allocated throughputs $Da_{k,j}$ will on average be obtained.

We claim:

1. A method of controlling the sending of data blocks pertaining to a plurality of temporary block flows to terminals on a number L of physical channels dedicated to packet mode transmission of data, L being a number at least equal to 1, wherein each physical channel has successive periods each intended for sending one block, the method comprising the steps of:

determining transmission throughputs respectively allocated to the block flows as a function of transmission throughputs respectively requested when creating the flows;

allotting to each new flow created at least one logical traffic channel supported by one of the L physical channels; and selecting, for each send period on a physical channel, a block flow to which a logical traffic channel supported by said physical channel is allotted so as to control sending of a block of the selected flow in said send period, the flow selection being governed by the values of the transmission throughputs allocated to the flows to which logical traffic channels supported by said physical channel are allotted, wherein the terminals are distributed into a plurality of subscription classes corresponding to different priority levels, wherein with each subscription class is associated a throughput restriction parameter representing a proportion of the overall throughput requested for the block flows to terminals of said class, and wherein the transmission throughputs allocated to the flows are so determined as to take account of the proportions represented by the restriction parameters in case of insufficiency of the physical channels dedicated to the packet mode relative to the total throughput requested for the block flows.

2. A method according to claim 1, wherein the throughput restriction parameter associated with a subscription class represents a proportion of the overall throughput requested for the set of block flows to terminals of said class which may not be allocated to said set of flows in at least some of the cases of insufficiency of the physical channels dedicated to the packet mode.

3. A method according to claim 2, comprising the following step in response to the creation of a block flow for which a throughput is requested such that the physical channels dedicated to the packet mode become insufficient relative to the total throughput requested:

allocating to the block flows to the terminals of the subscription class corresponding to the lowest priority level transmission throughputs smaller than the throughputs respectively requested for said flows, whereby the ratio of the overall throughput allocated to said flows to the overall throughput requested for said flows is at most equal to 1 minus the throughput proportion represented by the restriction parameter associated with said class.

4. A method according to claim 3, comprising the following steps in response to the creation of a block flow for which a throughput is requested such that the difference between the total throughput requested and the throughput capacity of the physical channels dedicated to the packet mode becomes greater than $$\sum_{k=1}^{n} M_k \cdot Dt_k,$$

where the subscription classes are indexed by an integer k ranging from 1 for the class of lowest priority to N for the class of highest priority, n is an integer such that $1 \leq n < N$, $M_k$ designates the throughput proportion represented by the throughput restriction parameter associated with class k and $Dt_k$ designates the overall throughput requested for the flows to the terminals of class k:

allocating to the block flows to the terminals of each class k, with $1 \leq k \leq n$, transmission throughputs substantially equal to $1-M_k$ times the throughputs respectively requested for said flows; and allocating to the block flows to the terminals of class n+1 transmission throughputs which are less than the throughputs respectively requested for said flows, the ratio of the overall throughput allocated to said flows to the overall throughput requested for said flows being at most equal to $1-M_{n+1}$.

5. A method according to claim 4, comprising the following step in response to the creation of a block flow for which a throughput is requested such that the difference between the total throughput requested and the throughput capacity of the physical channels dedicated to the packet mode becomes equal to $$\alpha \times \sum_{k=1}^{N} M_k \cdot Dt_k$$

with $\alpha > 1$:

allocating to the block flows to the terminals of each class k, with $1 \leq k \leq N$, transmission throughputs substantially equal to $(1-M_k)/\alpha$ times the throughputs respectively requested for said flows.

6. A method according to claim 4, comprising the following step in response to the deletion of a temporary block flow when the physical channels dedicated to the packet mode are insufficient relative to the total throughput requested for the block flows:

increasing the throughputs allocated to the block flows to the terminals of the subscription class corresponding to the highest priority level which were previously allocated throughputs smaller than the throughputs requested.

7. A method according to claim 1, wherein the allotting of a logical traffic channel to a new flow created comprises minimizing a cost function dependent on the transmission throughputs allocated to the block flows and respective reception capacities of the terminals for which said flows are intended, the reception capacity of a terminal representing a capacity of said terminal to simultaneously receive blocks on a plurality of physical channels.

8. A method according to claim 1, wherein a selection quantity is kept up-to-date for each block flow by adding thereto a quantity inversely proportional to the throughput allocated to said flow whenever said flow is selected for the sending of a block, and wherein the selecting of a block flow for each send period on a physical channel consists in selecting the flow, to which is allotted a logical traffic channel supported by said physical channel, for which said selection quantity is minimal.

9. An apparatus for controlling the sending of data blocks pertaining to a plurality of temporary block flows to terminals on a number L of physical channels dedicated to packet mode transmission of data, L being a number at least equal to 1, wherein each physical channel has successive periods each intended for sending one block, the apparatus comprising:

means for determining transmission throughputs respectively allocated to the block flows as a function of transmission throughputs respectively requested when creating the flows;

means for allotting to each new flow created at least one logical traffic channel supported by one of the L physical channels; and means for selecting, for each send period on a physical channel, a block flow to which a logical traffic channel supported by said physical channel is allotted so as to control sending of a block of the selected flow in said send period, the flow selection being governed by the values of the transmission throughputs allocated to the flows to which logical traffic channels supported by said physical channel are allotted, wherein the terminals are distributed into a plurality of subscription classes corresponding to different priority levels, wherein with each subscription class is associated a throughput restriction parameter representing a proportion of the overall throughput requested for the block flows to terminals of said class, and wherein the means for determining transmission throughputs are arranged to determine the transmission throughputs allocated to the flows by taking account of the proportions represented by the restriction parameters in case of insufficiency of the physical channels dedicated to the packet mode relative to the total throughput requested for the block flows.

10. An apparatus according to claim 9, wherein the throughput restriction parameter associated with a subscription class represents a proportion of the overall throughput requested for the set of block flows to terminals of said class which may not be allocated to said set of flows in at least some of the cases of insufficiency of the physical channels dedicated to the packet mode.

11. An apparatus according to claim 10, further comprising allocation means responsive to the creation of a block flow for which a throughput is requested such that the physical channels dedicated to the packet mode become insufficient relative to the total throughput requested, wherein said allocation means are arranged to allocate to the block flows to the terminals of the subscription class corresponding to the lowest priority level transmission throughputs smaller than the throughputs respectively requested for said flows, whereby the ratio of the overall throughput allocated to said flows to the overall throughput requested for said flows is at most equal to 1 minus the throughput proportion represented by the restriction parameter associated with said class.

12. An apparatus according to claim 11, further comprising second allocation means responsive to the creation of a block flow for which a throughput is requested such that the difference between the total throughput requested and the throughput capacity of the physical channels dedicated to the packet mode becomes greater than $$\sum_{k=1}^{n} M_k \cdot Dt_k,$$

where the subscription classes are indexed by an integer k ranging from 1 for the class of lowest priority to N for the class of highest priority, n is an integer such that $1 \leq n < N$, $M_k$ designates the throughput proportion represented by the throughput restriction parameter associated with class k and $Dt_k$ designates the overall throughput requested for the flows to the terminals of class k, wherein said second allocation means are arranged to allocate to the block flows to the terminals of each class k, with $1 \leq k \leq n$, transmission throughputs substantially equal to $1-M_k$ times the throughputs respectively requested for said flows, and wherein said second allocation means are arranged to allocate to the block flows to the terminals of class n+1 transmission throughputs which are less than the throughputs respectively requested for said flows, the ratio of the overall throughput allocated to said flows to the overall throughput requested for said flows being at most equal to $1-M_{n+1}$.

13. An apparatus according to claim 12, further comprising third allocation means responsive to the creation of a block flow for which a throughput is requested such that the difference between the total throughput requested and the throughput capacity of the physical channels dedicated to the packet mode becomes equal to $$\alpha \times \sum_{k=1}^{N} M_k \cdot Dt_k$$

with $\alpha > 1$, wherein said second allocation means are arranged to allocate to the block flows to the terminals of each class k, with $1 \leq k \leq N$, transmission throughputs substantially equal to $(1-M_k)/\alpha$ times the throughputs respectively requested for said flows.

14. An apparatus according to claim 12, further comprising throughput adjusting means responsive to the deletion of a temporary block flow when the physical channels dedicated to the packet mode are insufficient relative to the total throughput requested for the block flows, wherein said throughput adjusting means are arranged to increase the throughputs allocated to the block flows to the terminals of the subscription class corresponding to the highest priority level which were previously allocated throughputs smaller than the throughputs requested.

15. An apparatus according to claim 9, wherein the means for allotting a logical traffic channel to a new flow created comprise means for minimizing a cost function dependent on the transmission throughputs allocated to the block flows and respective reception capacities of the terminals for which said flows are intended, the reception capacity of a terminal representing a capacity of said terminal to simultaneously receive blocks on a plurality of physical channels.

16. An apparatus according to claim 9, further comprising means for updating a selection quantity for each block flow by adding thereto a quantity inversely proportional to the throughput allocated to said flow whenever said flow is selected for the sending of a block, and wherein the means for selecting a block flow for each send period on a physical channel comprise means for selecting the flow, to which is allotted a logical traffic channel supported by said physical channel, for which said selection quantity is minimal.

* * * * *